United States Patent
Shibata et al.

(10) Patent No.: US 11,010,876 B2
(45) Date of Patent: May 18, 2021

(54) IMAGE PROCESSING SYSTEM, IMAGE PROCESSING METHOD, AND COMPUTER-READABLE RECORDING MEDIUM

(71) Applicants: NEC Corporation, Tokyo (JP); TOKYO INSTITUTE OF TECHNOLOGY, Tokyo (JP)

(72) Inventors: Takashi Shibata, Tokyo (JP); Masayuki Tanaka, Tokyo (JP); Masatoshi Okutomi, Tokyo (JP)

(73) Assignees: NEC Corporation, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 216 days.

(21) Appl. No.: 15/738,189

(22) PCT Filed: Jun. 10, 2016

(86) PCT No.: PCT/JP2016/002813
§ 371 (c)(1),
(2) Date: Dec. 20, 2017

(87) PCT Pub. No.: WO2016/208142
PCT Pub. Date: Dec. 29, 2016

(65) Prior Publication Data
US 2018/0174282 A1    Jun. 21, 2018

(30) Foreign Application Priority Data

Jun. 26, 2015   (JP) .................................. 2015-129122

(51) Int. Cl.
*G06T 5/00*      (2006.01)
*G06T 5/50*      (2006.01)
(Continued)

(52) U.S. Cl.
CPC .............. *G06T 5/009* (2013.01); *G06F 17/16* (2013.01); *G06T 5/50* (2013.01); *H04N 1/387* (2013.01);
(Continued)

(58) Field of Classification Search
CPC combination set(s) only.
See application file for complete search history.

(56) References Cited

U.S. PATENT DOCUMENTS 6,778,698 B1 * 8/2004 Prakash ................. G06K 9/342
382/164
8,682,093 B2    3/2014 Connah et al.
(Continued)

FOREIGN PATENT DOCUMENTS

| CN | 104700381 | * 10/2018 | ............... G06T 5/50 |
| JP | 2009-224971 A | 10/2009 | |
| JP | 2010-103740 | 5/2010 | |

OTHER PUBLICATIONS

Feng et al., "Near-Infrared Guided Color Image Dehazing", 2013, IEEE (Year: 2013).*

(Continued)

*Primary Examiner* — Zhiyu Lu
(74) *Attorney, Agent, or Firm* — Finnegan, Henderson, Farabow, Garrett & Dunner, L.L.P.

(57) ABSTRACT

An image processing system includes: a weight determination circuitry configured to determine a band containing important information from among a group of images, which are acquired by a plurality of sensors, and to express a degree of importance of the band as a weight; a calculation circuitry configured to calculate, using the weight, an amount calculated based on a gradient of an image based on a gradient of each image, that is calculated based on the group of images, in order to restrict a gradient of an output image; and an image optimization circuitry configured to
(Continued)

compose the output image using the amount calculated based on the gradient of the image.

12 Claims, 3 Drawing Sheets

(51) Int. Cl.
| | |
|---|---|
| *H04N 1/60* | (2006.01) |
| *H04N 5/33* | (2006.01) |
| *H04N 1/387* | (2006.01) |
| *G06F 17/16* | (2006.01) |
| *H04N 5/225* | (2006.01) |
| *H04N 5/232* | (2006.01) |
| *H04N 5/345* | (2011.01) |
| *H04N 5/367* | (2011.01) |

(52) U.S. Cl.
CPC ............. *H04N 1/60* (2013.01); *H04N 5/2258* (2013.01); *H04N 5/23245* (2013.01); *H04N 5/332* (2013.01); *H04N 5/3454* (2013.01); *H04N 5/3675* (2013.01); *G06T 2207/10024* (2013.01); *G06T 2207/10032* (2013.01); *G06T 2207/10036* (2013.01); *G06T 2207/10048* (2013.01); *G06T 2207/20221* (2013.01)

(56) References Cited

U.S. PATENT DOCUMENTS

| | | | | |
|---|---|---|---|---|
| 8,903,130 | B1* | 12/2014 | Carceroni | G06K 9/00765 382/103 |
| 2005/0152603 | A1* | 7/2005 | Bober | G06T 7/73 382/190 |
| 2010/0086226 | A1* | 4/2010 | Rozzi | H04N 1/6058 382/254 |
| 2010/0103268 | A1 | 4/2010 | Tokuyama | |
| 2011/0052029 | A1 | 3/2011 | Connah et al. | |
| 2013/0051665 | A1* | 2/2013 | Shinozaki | G06T 5/00 382/167 |

OTHER PUBLICATIONS

International Search Report dated Jul. 26, 2016, in corresponding PCT International Application.
Partial English Translation of Written Opinion of the International Searching Authority from the Japanese Patent Office.
Takashi Shibata et al., "Improvement in Visibility of Images by Integration of Visible and Near-Infrared Images—Towards Various Applications such as Dehazing and Denoising", Proceedings of the 21st Symposium on Sensing via Image Information, SSII2015, Jun. 10, 2015, pp. 1 to 6, in particular, "2. Proposed Technique" to "2.3 Image Synthesis".
Shin Yoshizawa et al., "Seamless Cloning with Texture Restoration via Poisson Image Analogy", IPSJ SIG Technical Report, Computer Graphics and CAD(CG), Feb. 13, 2014, vol. 2014-CG-154, No. 6, pp. 1 to 10.
Yousuke Nagatomo et al. "A Fast Poisson Image Synthesis Algorithm using Image Subsampling and Gradient-based Interpolation", IEICE Technical Report, Jul. 25, 2014, vol. 114, No. 172, pp. 47 to 52.
Decision to Grant a Patent, dated Dec. 2, 2020, issued by the Japanese Patent Office in counterpart Japanese Patent Application No. JP 2017-524597.

\* cited by examiner

IMAGE PROCESSING SYSTEM, IMAGE PROCESSING METHOD, AND COMPUTER-READABLE RECORDING MEDIUM

CROSS-REFERENCE TO RELATED PATENT APPLICATIONS

This application is a National Stage Entry of International Application No. PCT/JP2016/002813, filed Jun. 10, 2016, which claims priority from Japanese Patent Application No. 2015-129122, filed Jun. 26, 2015. The entire contents of the above-referenced applications are expressly incorporated herein by reference.

TECHNICAL FIELD

This invention relates to an image processing technology, and more particularly, to an image processing system, an image processing method, and a computer-readable recording medium.

BACKGROUND ART

Recently, a variety of image composition methods have been developed. Moreover, a variety of cameras that operate under a variety of settings (e.g., exposure amount and exposure time) are available, and those cameras acquire images with a variety of sensitivity characteristics for a wavelength band. Moreover, even cameras with the same settings acquire substantially different images depending on whether or not to light the flash during photography.

Moreover, cameras using sensors suited for photographing a variety of target objects are widespread. For example, a monitoring camera using a visible light sensor is widespread in order to monitor a person and other such objects. Meanwhile, a camera using a non-visible light sensor, for example, a near-infrared camera or a far-infrared camera, is also widespread for night-time monitoring. Moreover, among other cameras, a near-ultraviolet camera is also commercially available. Alternatively, among other cameras, a device configured to image a wavelength that is longer than a wavelength region of visible light, for example, a terahertz wave and a radio wave, is also commercially available.

In view of the above-mentioned background, in order to easily analyze a group of images acquired by a plurality of sensors, there is a need to display the group of images as a single image. In Patent Document 1, there is disclosed a method of expressing, in order to easily analyze the group of images acquired by the plurality of sensors, information on the group of images of a plurality of bands using a single color image.

In the method disclosed in Patent Document 1 described above, as described later in detail with reference to FIG. 1, a structure tensor is calculated based on gradient information of the group of images of the plurality of bands, and an output image is composed using the structure tensor.

PRIOR ART DOCUMENTS

Patent Document

Patent Document 1: U.S. Pat. No. 8,682,093 B2

SUMMARY OF THE INVENTION

Problem to be Solved by the Invention

However, in the method of Patent Document 1, in calculating the structure tensor, the structure tensor is calculated simply based on a total sum of gradients without considering characteristics of each band. Therefore, with the method of Patent Document 1, there is a problem in that important information contained in a particular band is not reflected on a color image to be output.

It is an object of this invention to provide an image processing system, an image processing method, a computer-readable recording medium, which are capable of displaying, in order to easily analyze a group of images acquired by a plurality of sensors, a single image containing important information of each band.

Means to Solve the Problem

A form of this invention is an image processing system which comprising: weight determination means for determining a band containing important information from among a group of images, which are acquired by a plurality of sensors, and for expressing a degree of importance of the band as a weight; calculation means for calculating, using the weight, an amount calculated based on a gradient of an image based on a gradient of each image, that is calculated based on the group of images, in order to restrict a gradient of an output image; and image optimization means for composing the output image using the amount calculated based on the gradient of the image.

Effect of the Invention

According to this invention, it is possible to provide the image processing system, which is capable of displaying, in order to easily analyze the group of images acquired by the plurality of sensors, the single image containing the important information of each band.

MODE FOR EMBODYING THE INVENTION

Related Art

First, in order to facilitate understanding of this invention, an image processing system according to the related art, which is disclosed in Patent Document 1 described above, is described.

Figure 1:
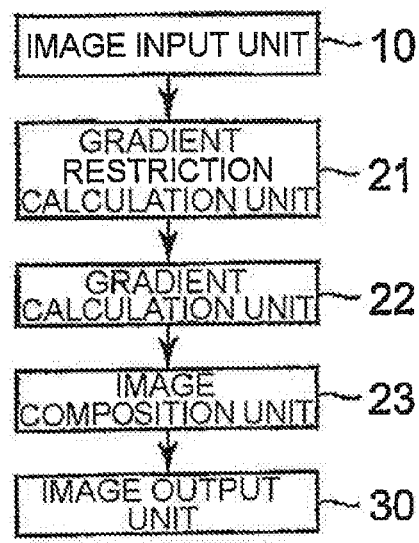
FIG. 1 is a block diagram for illustrating a schematic configuration of an image processing system according to the related art disclosed in Patent Document 1.

FIG. 1 is a block diagram for illustrating the image processing system according to the related art described in Patent Document 1. The image processing system described in Patent Document 1 includes an image input unit 10, a gradient restriction calculation unit 21, a gradient calculation unit 22, an image composition unit 23, and an image output unit 30.

The image input unit 10 is supplied with a group of images of a plurality of bands and a color image for reference. Then, the image input unit 10 records the input images in a memory (not shown) or the like.

The gradient restriction calculation unit 21 calculates a total sum of gradients, which is called a structure tensor, for each pixel based on gradient information of the group of images of the plurality of bands.

The gradient calculation unit 22 calculates, based on the structure tensor calculated in the gradient restriction calculation unit 21 and a gradient of the color image for reference, a gradient of an output image such that the output image exactly matches the calculated structure tensor, and further that a least square error between the gradient of the input color image and the gradient of the output image is minimized.

The image composition unit 23 composes the output image using Poisson composition based on the gradient calculated by the gradient calculation unit 22.

However, in the image processing system according to Patent Document 1 illustrated in FIG. 1, in calculating the structure tensor, the structure tensor is calculated simply based on the total sum of the gradients without considering characteristics of each band. Therefore, with the image processing system according to Patent Document 1 illustrated in FIG. 1, there is a problem in that important information contained in a particular band is not reflected on a color image to be output.

Next, a problem to be solved by this invention is described with the use of a specific example. Now, there is described, as an example, a case in which the group of images of multiple bands include a visible image and a near-infrared image obtained by photographing a mist region, and in which the mist region is unclear and noisy in the visible image, but there is little noise and far scenery is photographed clearly in the near-infrared image.

In this case, in the mist region, the near-infrared image forms a clearer image, and hence it is desired to generate the color image to be output based on a gradient of the near-infrared image. However, in the image processing system according to Patent Document 1 illustrated in FIG. 1, the structure tensor is calculated as a total sum of a gradient calculated based on the visible image and a gradient calculated based on the near-infrared image. Therefore, with the image processing system according to Patent Document 1 illustrated in FIG. 1, the color image to be output becomes an unclear image due to the effects of gradient information of the input visible image as a result.

Embodiment

Next, an embodiment of this invention is described in detail with reference to the drawings.

Description of Configuration

Figure 2:
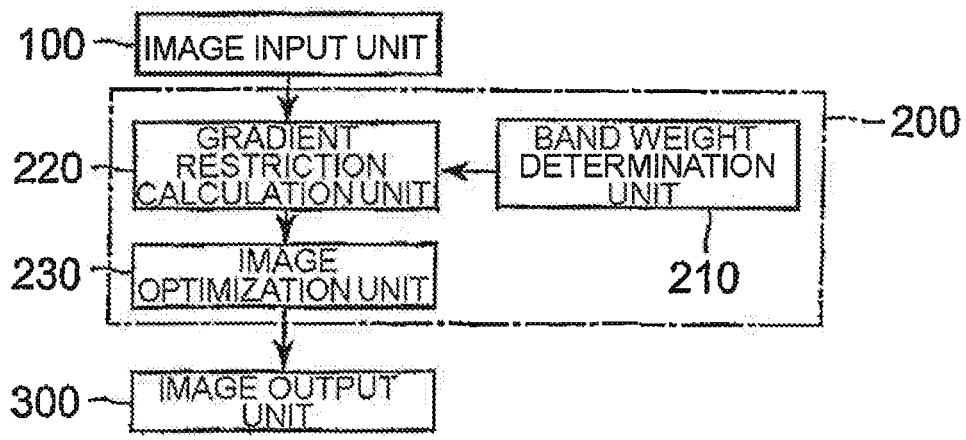
FIG. 2 is a block diagram for illustrating a schematic configuration of an image processing system according to an example embodiment of this invention.

FIG. 2 is a block diagram for illustrating a schematic configuration of an image processing system according to the example embodiment of this invention.

Referring to FIG. 2, the image processing system according to the embodiment of this invention includes an image input unit 100, a computer (central processing unit; processor; data processing device) 200, which operates under program control, and image output unit 300.

Figure 3:
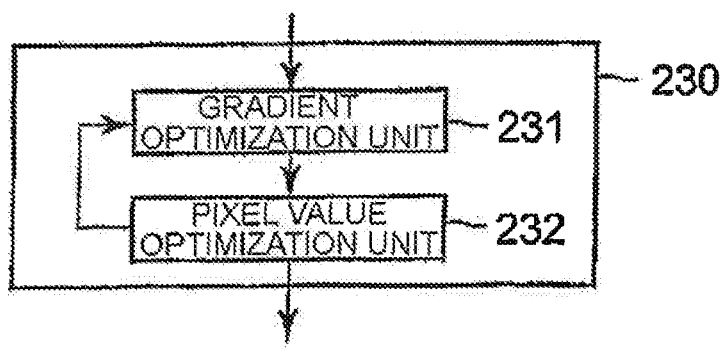
FIG. 3 is a block diagram for illustrating a schematic configuration of an image optimization unit used in the image processing system illustrated in FIG. 2.

The computer (central processing unit; processor; data processing device) 200 includes a band weight determination unit 210, a gradient restriction calculation unit 220, and an image optimization unit 230. Further, as illustrated in FIG. 3, the image optimization unit 230 includes a gradient optimization unit 231 and a pixel value optimization unit 232.

The above-mentioned means each operate generally as follows.

The image input unit 100 is supplied with images obtained by a camera and other such devices. As the supplied images, a color image and images acquired by other sensors may be input separately. Then, the image input unit 100 records the supplied images in a memory (not shown) or the like.

In the following description, when an RGB image is given as an input color image, red, green, and blue pixel values of the i-th pixel are expressed as $R_i$, $G_i$, and $B_i$, respectively. Moreover, those components are collectively expressed as:

$$I_i = (R_i, G_i, B_i). \qquad \text{[Expression 1]}$$

Further, when there is an image that is acquired from another sensor other than the input color image, a pixel value of the i-th pixel is expressed using a subscript also for the image. For example, when a case in which a near-infrared image is supplied in addition to the input color image is described as an example, the i-th pixel value of the near-infrared image may be expressed as $N_i$.

Moreover, similarly to the input images, a composite image is also expressed by a matrix obtained by arranging pixel values of each pixel in raster scan order. More specifically, when an RGB image is given as an output color image, red, green, and blue pixel values of the i-th pixel are expressed as $R_i$, $G_i$, and $B_i$, respectively.

An image output unit 300 comprises an output device configured to output a reconstructed image. The image output unit 300 is implemented by a display device or the like.

The band weight determination unit 210 is configured to determine a weight expressing which band is important from among the input images that have been supplied to the image input unit 100. As a method of determining the weight, for example, a degree of importance of each band may be provided by a user in advance as a parameter, or may be calculated automatically using machine learning or other such technology. Moreover, the degree of importance of each band may be the same over the entire image, or a different value may be used for each pixel.

As an example of the case in which the degree of importance of each band has a different value for each pixel, the following case is described below as an example. First, as the group of images of multiple bands, it is assumed that there are a visible image and a near-infrared image obtained by photographing a mist region. Then, it is assumed that the mist region is unclear and noisy in the visible image, but there is little noise and far scenery is photographed clearly in the near-infrared image.

In this case, the band weight determination unit 210 may set a degree of importance of a band of the near-infrared image to be high only in the mist region, and set a degree of importance of a band of the visible image (that is, RGB) to be high in other regions.

In the following, the i-th band weight determined in the band weight determination unit 210 is expressed using a band weight matrix $$W_i \qquad \text{[Expression 2]}$$

having weights of respective bands as diagonal components. For example, the case in which the near-infrared image is input in addition to the input color image is described as an example. In this case, when the i-th weights of the RGB and near-infrared images are determined as $W_{Ri}$, $W_{Gi}$, $W_{Bi}$, and $W_{Ni}$, the i-th band weight matrix $$Wi \qquad \text{[Expression 3]}$$

may be expressed as Expression 4 below, for example.

$$W_i = \begin{pmatrix} W_{Ri} & 0 & 0 & 0 \\ 0 & W_{Gi} & 0 & 0 \\ 0 & 0 & W_{Bi} & 0 \\ 0 & 0 & 0 & W_{Ni} \end{pmatrix} \qquad \text{[Expression 4]}$$

The gradient restriction calculation unit 220 is configured to calculate for each pixel, based on the group of input images supplied to the image input unit 100, and on the band weight matrix $$Wi \qquad \text{[Expression 5]}$$

expressing importance of each band, which is obtained in the band weight determination unit 210, the structure tensor $$Hi \qquad \text{[Expression 6]}$$

restricting the gradient of the output color image. In order to calculate the structure tensor, the gradient restriction calculation unit 220 first calculates vertical and horizontal derivatives in an image space based on the group of input images.

In the following description, a gradient of the i-th pixel is expressed by the following gradient matrix $$\nabla \tilde{I}_i. \qquad \text{[Expression 7]}$$

For example, when the case in which the near-infrared image is supplied in addition to the input color image is described as an example, the gradient restriction calculation unit 220 may calculate the i-th gradient matrix $$\nabla \tilde{I}_i \qquad \text{[Expression 8]}$$

as Expression 9 below:

$$\nabla \tilde{I}_i = \begin{pmatrix} \nabla_x R_i & \nabla_y R_i \\ \nabla_x G_i & \nabla_y G_i \\ \nabla_x B_i & \nabla_y B_i \\ \nabla_x N_i & \nabla_y N_i \end{pmatrix} \qquad \text{[Expression 9]}$$

where $\nabla x$ is a horizontal derivative, and $\nabla y$ is a vertical derivative.

Next, the gradient restriction calculation unit 220 may calculate, using the band weight matrix $$Wi \qquad \text{[Expression 10]}$$

expressing the importance of each band and the gradient matrix $$\nabla \tilde{I}_i, \qquad \text{[Expression 11]}$$

the structure tensor $$Hi \qquad \text{[Expression 12]}$$

as Expression 13 below.

$$H_i = \nabla \tilde{I}_i^T W_i \nabla \tilde{I}_i = \begin{pmatrix} \nabla_x R_i & \nabla_y R_i \\ \nabla_x G_i & \nabla_y G_i \\ \nabla_x B_i & \nabla_y B_i \\ \nabla_x N_i & \nabla_y N_i \end{pmatrix}^T \qquad \text{[Expression 13]}$$

$$\begin{pmatrix} W_{Ri} & 0 & 0 & 0 \\ 0 & W_{Gi} & 0 & 0 \\ 0 & 0 & W_{Bi} & 0 \\ 0 & 0 & 0 & W_{Ni} \end{pmatrix} \begin{pmatrix} \nabla_x R_i & \nabla_y R_i \\ \nabla_x G_i & \nabla_y G_i \\ \nabla_x B_i & \nabla_y B_i \\ \nabla_x N_i & \nabla_y N_i \end{pmatrix}$$

The image optimization unit 230 generates the composite image such that a value corresponding to the structure tensor calculated based on the composite image to be output matches the structure tensor $$Hi \qquad \text{[Expression 14]}$$

calculated in the gradient restriction calculation unit 220 as close as possible, and further that color of the input color image and color of the output color image match as close as possible.

In the following description, the composite image is expressed as:

$$[Xi]. \qquad \text{[Expression 15]}$$

The composite image has three components, that is, RGB components for each pixel, and hence $$[Xi] \qquad \text{[Expression 16]}$$

becomes an N×3 matrix when the number of pixels of the composite image is N.

In the following description, the image optimization unit 230 may minimize an optimization function, which is specifically expressed as Expression 18 below, for example, in terms of $$[Xi] \qquad \text{[Expression 17]}$$

to generate the composite image.

$$E(\{X\_i\}) = \sum_i \|\nabla X_i^T \nabla X_i - H_i\|_F^2 + \qquad \text{[Expression 18]}$$
$$\alpha \|A_i(\nabla X_i - \nabla I_i)\|_F^2 + \varepsilon \|X_i - I_i\|_2^2$$

Herein, the first term on the right side of Expression 18 is a term for placing such restriction that the structure tensor $$Hi \qquad \text{[Expression 19]}$$

calculated in the gradient restriction calculation unit 220 matches the value $$(\nabla X_i^T \nabla X_i) \qquad \text{[Expression 20]}$$

corresponding to the structure tensor calculated based on the composite image. The subscript F means a Frobenius norm of the matrix.

Moreover, the second term on the right side of Expression 18 is a term for placing such restriction that colors of the input color image and the composite image match as close as possible, and the matrix $$A_i \qquad \text{[Expression 21]}$$

is a matrix for adjusting a color matching degree. For example, as compared to a luminance component of color, in order to more closely match the input color image and the composite image for a color difference component, the matrix $$A_i \quad \text{[Expression 22]}$$

may be given, for example, as Expression 23 below:

$$A_i = \begin{pmatrix} \delta & 0 & 0 \\ 0 & 1 & 0 \\ 0 & 0 & 1 \end{pmatrix} U \quad \text{[Expression 23]}$$

where $$U \quad \text{[Expression 24]}$$

is a matrix for converting a color space, and a matrix for converting an sRGB color space into a YUV color space may be used, for example.

The third term on the right side of Expression 18 is a term for matching a pixel value of an input image and a pixel value of the composite image as close as possible. The subscript "2" means an L2-norm of a vector. Here, α, ε, and δ are parameters that are determined by the user in advance.

Then, in order to minimize the optimization function expressed by Expression 18 in terms of $$X_i, \quad \text{[Expression 25]}$$

the image optimization unit 230 further comprises the gradient optimization unit 231 and the pixel value optimization unit 232.

Then, the image optimization unit 230 uses the gradient optimization unit 231 and the pixel value optimization unit 232 to alternately optimize a gradient $$[\nabla Xi] \quad \text{[Expression 26]}$$

and a pixel value $$[Xi] \quad \text{[Expression 27]}$$

of an image. More specifically, for optimization in terms of $$[Xi] \quad \text{[Expression 28]}$$

the image optimization unit 230 minimizes the gradient of $$[Xi], \quad \text{[Expression 29]}$$

that is, $$[\nabla Xi] \quad \text{[Expression 30]}$$

independently for each pixel. To that end, the gradient optimization unit 231 expands the optimization function expressed by Expression 18 as Expression 31 below.

$$E(\{v\_i\}, \{X\_i\}) = \sum_i \|v_i^T v_i - H_i\|_F^2 + \quad \text{[Expression 31]}$$
$$\beta \|v_i - \nabla X_i\|_F^2 + \alpha \|A_i(v_i - \nabla I_i)\|_F^2 + \varepsilon \|X_i - I_i\|_2^2$$

Here, Expression 18 has been the optimization function in terms of $$[Xi], \quad \text{[Expression 32]}$$

but Expression 31 optimizes, in addition to $$[Xi], \quad \text{[Expression 33]}$$

$$[vi] \quad \text{[Expression 34]}$$

at the same time.

Here, the first, third, and fourth terms on the right side of Expression 31 are equivalent to those of Expression 18, and hence a description thereof is omitted.

The second term on the right side of Expression 31 is a term for placing such restriction that $$[vi] \quad \text{[Expression 35]}$$

matches $$[\nabla Xi], \quad \text{[Expression 36]}$$

and β is a parameter that is increased every time the gradient optimization unit 231 and the pixel value optimization unit 232 alternately optimize the gradient $$[\nabla Xi] \quad \text{[Expression 37]}$$

and the pixel value $$[Xi] \quad \text{[Expression 38]}$$

of the image, and is a parameter that eventually has a very large value.

When β is large, the image optimization unit 230 operates such that $$[vi] \quad \text{[Expression 39]}$$

substantially matches $$[\nabla Xi], \quad \text{[Expression 40]}$$

and hence optimizing Expression 31 in terms of $$[Xi] \quad \text{[Expression 41]}$$

and $$[vi] \quad \text{[Expression 42]}$$

is equivalent to optimizing Expression 18 in terms of $$[Xi], \quad \text{[Expression 43]}$$

The gradient optimization unit 231 may minimize only a part of Expression 31 that corresponds to $$[vi], \quad \text{[Expression 44]}$$

for example, for each pixel. More specifically, the gradient optimization unit 231 may minimize Expression 46 below in terms of $$[vi], \quad \text{[Expression 45]}$$

for example, to calculate the gradient of the composite image.

$$E(\{v\_i\}) = \quad \text{[Expression 46]}$$
$$\sum_i \|v_i^T v_i - H_i\|_F^2 + \alpha \|A_i(v_i - \nabla I_i)\|_F^2 + \beta \|v_i - \nabla X_i\|_F^2$$

The gradient optimization unit 231 may calculate the part corresponding to $$[vi] \quad \text{[Expression 47]}$$

independently for each pixel, and hence may calculate $$[vi] \quad \text{[Expression 48]}$$

at high speed using parallel computation or other such technology, for example.

Next, the pixel value optimization unit 232 may minimize, for example, only a part of Expression 31 that corresponds to $$[Xi] \quad \text{[Expression 49]}$$

over the entire image as expressed by Expression 50 below.

$$E(\{X\_i\}) = \Sigma_i \beta \|v_i - \nabla X_i\|_F^2 + \beta \|v_i - \nabla X_i\|_F^2 \quad \text{[Expression 50]}$$

The part corresponding to $$[Xi] \quad \text{[Expression 51]}$$

is in a quadric form, and hence the pixel value optimization unit 232 may use Fourier transform, for example, to calculate the pixel value of the image at high speed.

As described above, the image optimization unit 230 comprises the gradient optimization unit 231 and the pixel value optimization unit 232, and a new auxiliary variable $$[vi] \quad \text{[Expression 52]}$$

is added to Expression 18 to form the optimization function corresponding to Expression 31, which separates the part that can be optimized independently for each pixel (Expression 46) and the part that can be calculated using the Fourier transform or other such image conversion efficiently over the entire image (Expression 50), with the result that the optimization function corresponding to Expression 18 can be minimized efficiently.

[Description of Operation]

Figure 4:
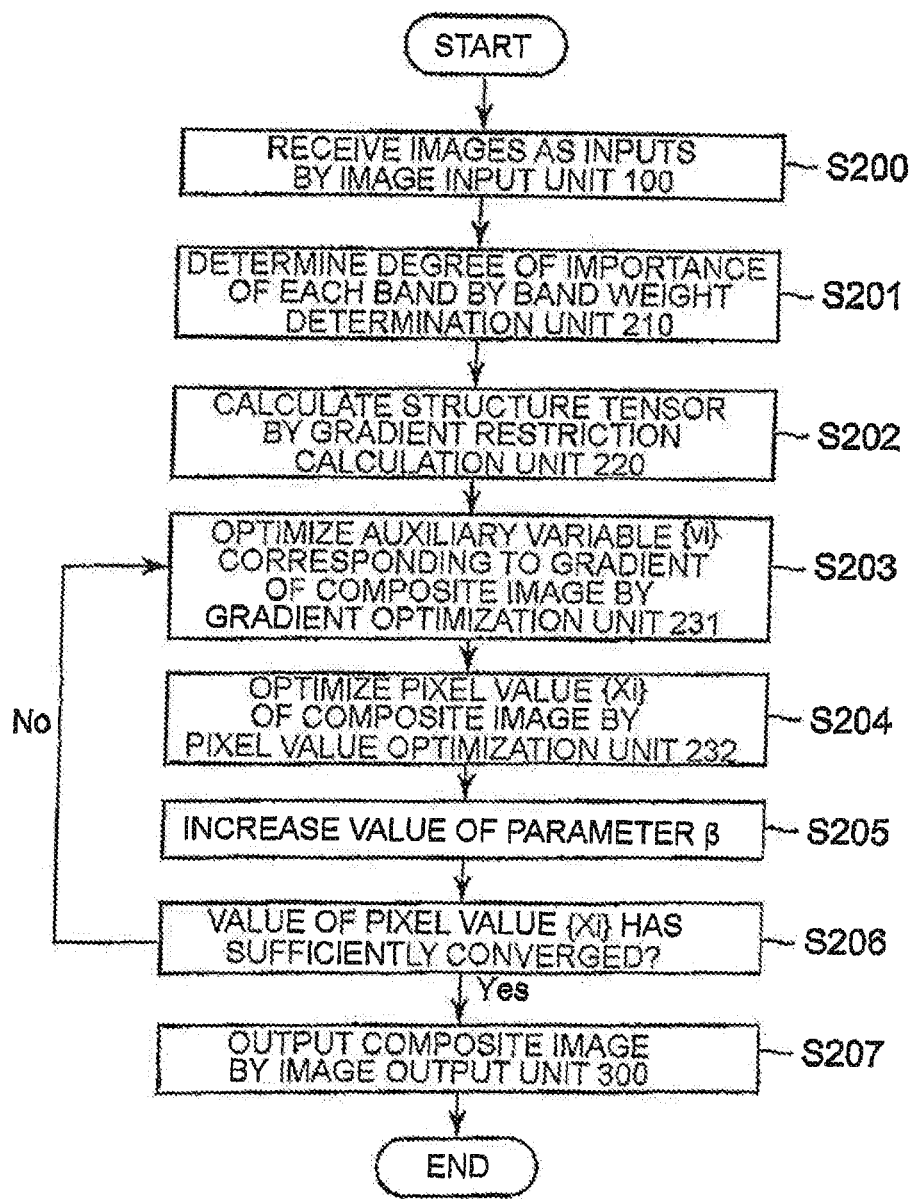
FIG. 4 is a flow chart for illustrating operation of the image processing system illustrated in FIG. 2.

Next, referring to a flow chart of FIG. 4, overall operation of the image processing system according to this example embodiment is described in detail.

First, the image input unit 100 receives, as inputs, the color image and the images of multiple bands acquired from a plurality of sensors (Step S200).

Next, the band weight determination unit 210 determines the degree of importance of each band (Step S201).

Further, the gradient restriction calculation unit 220 calculates the structure tensor $$Hi \quad \text{[Expression 53]}$$

(Step S202).

The gradient optimization unit 231 optimizes the auxiliary variable $$[vi] \quad \text{[Expression 54]}$$

corresponding to the gradient of the composite image using Expression 46, for example (Step S203).

Next, the pixel value optimization unit 232 optimizes the pixel value $$[Xi] \quad \text{[Expression 55]}$$

of the composite image using Expression 50, for example (Step S204).

Next, the image optimization unit 230 increases a value of the parameter B for placing such restriction that the auxiliary variable $$\{vi\} \quad \text{[Expression 56]}$$

matches the pixel value $$[Xi] \quad \text{[Expression 57]}$$

of the composite image (Step S205).

Next, the image optimization unit 230 determines whether or not the value of the pixel value $$[Xi] \quad \text{[Expression 58]}$$

has sufficiently converged (Step S206). If the value of the pixel value $$[Xi] \quad \text{[Expression 59]}$$

has not sufficiently converged (No in Step S206), the image optimization unit 230 repeats the processing of Steps S203 to S205 again (Step S206).

If the value of the pixel value $$[Xi] \quad \text{[Expression 60]}$$

has been sufficiently converged (Yes in Step S206), the image output unit 300 outputs the composite image formed of the pixel value (Step S207).

Description of Effects

Next, effects of the example embodiment will be described.

According to the example embodiment of this invention, the composite image integrating important information contained in each band can be generated based on a plurality of images having different characteristics. This is because the band weight determination unit 210 determines the weight expressing which band is important from among the input images that have been supplied, and the gradient restriction calculation unit 220 calculates the structure tensor using the determined band weight, with the result that the composite image reflecting gradient information of the band more can be generated.

Further, according to the example embodiment of this invention, the gradient of the output image and the pixel value of the output image are alternately optimized, with the result that the composite image can be generated at higher speed and higher accuracy. This is because the image optimization unit 230 comprises the gradient optimization unit 231 and the pixel value optimization unit 232, and the optimization function obtained by adding the auxiliary variable to the original optimization function is formed to further separate the part that can be optimized independently for each pixel and the part that can be calculated using the Fourier transform or other such image conversion efficiently over the entire image, which are optimized alternately, with the result that the original optimization function can be minimized efficiently.

The respective units of the image processing system may be implemented using a combination of hardware and software. In an embodiment combining hardware and software, an image processing program is loaded on a random access memory (RAM), and a control unit (central processing unit (CPU)) or other such hardware is operated based on the program to implement the respective units as a variety of means. Moreover, the program may be distributed by being recorded on a computer-readable recording medium. The program recorded on the computer-readable recording medium is read into a memory wiredly, wirelessly, or via the computer-readable recording medium itself to operate the control unit and other such units. Examples of the computer-readable recording medium include an optical disc, a magnetic disk, a semiconductor memory device, and a hard disk.

When the above-mentioned example embodiment is described in different terms, a computer that is caused to operate as the image processing system can be implemented by causing the computer to operate as the band weight determination unit 210, the gradient restriction calculation unit 220, and the image optimization unit 230 based on the image processing program loaded on the RAM.

As described above, according to the example embodiment of this invention, the composite image integrating the important information contained in each band can be generated based on the plurality of images having different characteristics. In addition, according to the example embodiment of this invention, the composite image can be generated at higher speed and higher accuracy by alternately optimizing the gradient of the output image and the pixel value of the output image.

Further, the specific configuration of this invention is not limited to the example embodiment described above, and changes that do not depart from the gist of the invention are encompassed by the invention. For example, in the above-mentioned example embodiment, the structure tensor is used as the amount calculated based on the gradient of the image, but it is apparent that this invention is not limited thereto.

While the invention has been described particularly shown and described with reference to the example embodiment thereof, the invention is not limited to the above-mentioned example embodiment. It will be understood by those skilled in the art that various changes in form and details may be therein without departing from the spirit and scope of the present invention as defined by the claims.

INDUSTRIAL APPLICABILITY

With the use of this invention, for example, when a satellite image or other such image is analyzed by an image analyst, adjustment can be made by the band weight determination unit determining a weight expressing which band is important from among input images that have been input such that image quality that the image analyzer thinks is optimum is obtained.

In addition, similarly when a medical image is analyzed by a healthcare professional, a researcher, or other such analyst, this invention can be applied to such use as obtaining image quality that the analyst thinks is optimum by adjusting the weight by the band weight determination unit, and analyzing the image.

Further, this invention can be used for application to such use of sharing experience and expertise in image analysis of those image analysts by another image analyst using the band weight adjusted by each of those image analysts.

This application is based upon and claims the benefit of priority from Japanese Patent Application No. 2015-129122, filed on Jun. 26, 2015, the disclosure of which is incorporated herein in its entirety by reference.

EXPLANATION OF REFERENCE SIGNS 100 image input unit
200 computer (central processing unit; processor; data processing device)
210 band weight determination unit
220 gradient restriction calculation unit
230 image optimization unit
231 gradient optimization unit
232 pixel value optimization unit
300 image output unit

The invention claimed is:

1. An image processing system, comprising:
a weight determination circuitry configured to determine a band containing important information from among a group of images, including a visible image and a near-infrared image, that are acquired by a plurality of different sensors, and to express a degree of importance of the band as a weight;
a calculation circuitry configured to calculate, using the weight, a structure tensor based on a gradient of each image, that is calculated based on the group of images, in order to restrict a gradient of an output image; and
an image optimization circuitry configured to compose the output image using the structure tensor,
wherein the calculation circuitry is configured to calculate the structure tensor using a band weight matrix expressing the degree of importance of each band and a gradient matrix expressing a gradient of each pixel,
wherein the weight determination circuitry is configured to set the degree of importance of the band of the near-infrared image to be high only in a mist region and to set the degree of the importance of the band of the visible image to be high in regions other than the mist region.

2. An image processing system according to claim 1, wherein the image optimization circuitry comprises:
a gradient optimization circuitry configured to optimize the gradient of the output image independently for each pixel; and
a pixel value optimization circuitry configured to optimize a pixel value of the output image over an entire image using the optimized gradient.

3. An image processing system according to claim 1, wherein the weight determination circuitry is configured to provide the degree of importance of each band in advance as a parameter, or to automatically calculate the degree of importance of each band using a machine learning technology.

4. An image processing system according to claim 1, wherein the weight determination circuitry is configured to determine the degree of importance of each band for each pixel.

5. An image processing method for an image processing system, which is configured to analyze a group of images, including a visible image and a near-infrared image, that are acquired by a plurality of different sensors, to obtain a single image, the image processing method comprising:
determining a band containing important information from among the group of images including the visible image and the near-infrared image, and expressing a degree of importance of the band as a weight;
calculating, using the weight, a structure tensor based on a gradient of each image, that is calculated based on the group of images, in order to restrict a gradient of an output image; and
composing the output image using the structure tensor,
wherein the calculating comprises calculating the structure tensor using a band weight matrix expressing the degree of importance of each band and a gradient matrix expressing a gradient of each pixel,
wherein the determining comprises setting the degree of importance of the band of the near-infrared image to be high only in a mist region and setting the degree of the importance of the band of the visible image to be high in regions other than the mist region.

6. An image processing method according to claim 5, wherein the composing comprises:
optimizing the gradient of the output image independently for each pixel; and
optimizing a pixel value of the output image over an entire image using the optimized gradient.

7. An image processing method according to claim 5, wherein the determining comprises providing the degree of importance of each band in advance as a parameter, or automatically calculating the degree of importance of each band using a machine learning technology.

8. An image processing method according to claim 5, wherein the determining comprises determining the degree of importance of each band for each pixel.

9. A non-transitory computer-readable recording medium having recorded thereon an image processing program for an image processing system, the image processing program causing a computer to analyze a group of images, including a visible image and a near-infrared image, that are acquired by a plurality of different sensors, to obtain a single image, the image processing program further causing the computer to execute:
    a weight determination procedure of determining a band containing important information from among the group of images including the visible image and the near-infrared image, and of expressing a degree of importance of the band as a weight;
    a calculation procedure of calculating, using the weight, a structure tensor based on a gradient of each image, that is calculated based on the group of images, in order to restrict a gradient of an output image; and
    an image optimization procedure of composing the output image using the structure tensor,
    wherein the calculation procedure causes the computer to calculate the structure tensor using a band weight matrix expressing the degree of importance of each band, and a gradient matrix expressing a gradient of each pixel,
    wherein the weight determination procedure causes the computer to set the degree of importance of the band of the near-infrared image to be high only in a mist region and to set the degree of the importance of the band of the visible image to be high in regions other than the mist region.

10. A non-transitory computer-readable recording medium according to claim 9, wherein the image optimization procedure causes the computer to execute:
    a gradient optimization procedure of optimizing the gradient of the output image independently for each pixel; and
    a pixel value optimization procedure of optimizing a pixel value of the output image over an entire image using the optimized gradient.

11. A non-transitory computer-readable recording medium according to claim 9, wherein the weight determination procedure causes the computer to provide the degree of importance of each band in advance as a parameter, or to automatically calculate the degree of importance of each band using a machine learning technology.

12. A non-transitory computer-readable recording medium according to claim 9, wherein the weight determination procedure causes the computer to determine the degree of importance of each band for each pixel.

* * * * *